Aug. 9, 1966 J. W. BALDE ETAL 3,266,005

APERTURED THIN-FILM CIRCUIT COMPONENTS

Filed April 15, 1964

INVENTORS
J. W. BALDE
C. A. R. KAGAN
By Don P. Bush
ATTORNEY

United States Patent Office 3,266,005
Patented August 9, 1966

3,266,005

APERTURED THIN-FILM CIRCUIT COMPONENTS

John W. Balde, Raritan Township, Hunterdon County, and Claude A. R. Kagan, Hopewell Township, Mercer County, N.J., assignors to Western Electric Company, Incorporated, New York, N.Y., a corporation of New York Filed Apr. 15, 1964, Ser. No. 359,828
1 Claim. (Cl. 338—308)

Figure 1:
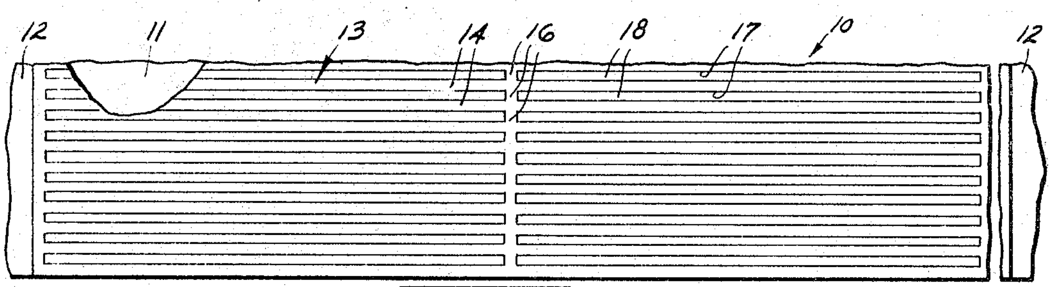

The present invention relates to thin-film components and circuits. More particularly the invention relates to the attainment of desired electrical characteristics of thin-film circuits and components by forming a predetermined pattern of apertures in the thin films making up the circuits or components.

The invention relates more specifically to the formation of thin-film resistors by utilizing apertured thin-film material so that the thin-film resistors have relatively high values of resistance, as compared to the values of resistance they would have if continuous or uninterrupted thin films of material of the same area and film thickness were employed.

Thin metallic film resistors can be made to possess high stability and can be accurately adjusted to exact values. In particular, tantalum thin-film resistors as described in copending applications of D. Gerstenberg, Serial No. 142,702, filed October 3, 1961, and Basseches-McGeough-McLean, Serial No. 845,754, filed October 12, 1959, which are assigned to Bell Telephone Laboratories, Inc., possess these attributes to a high degree. Such thin metal films, however, usually possess film resistances of approximately 100 to 500 ohms per square, and circuit resistance needs may call for resistances much higher in value.

The resistance of such thin-film resistors could be increased further by reducing the active thickness and controlling the content of doping materials such as nitrogen and oxygen doping of the thin films; however, these techniques require very exacting control of the operating parameters and may not provide the most economical method of producing resistors of relatively high values of resistance.

It is also customary to increase the resistance of the tantalum thin films by altering the shape of the resistive paths to increase the aspect ratio by decreasing the width of the resistive path. For example, if resistors of 100,000 ohms were required, this could be achieved by depositing a long, narrow path of tantalum, having approximately 100 ohms per square sheet resistance, on a substrate sheet to produce a zigzag path five mils wide and five inches long. To form this resistor on a substrate sheet one-half inch long and one-eighth inch wide, the path would have to be folded on itself ten times, even though the path extends along the one-half inch dimension.

Increasing the resistance of a thin-film resistor by controlling the shape thereof involves a risk of introducing unreliability when the width of the film approaches the diameter of pinhole faults associated with the deposited films. Even though techniques may be developed to reduce the number of such flaws in the tantalum thin films, faults of a few mils are difficult to avoid in thin films. It is also difficult to prevent etching faults from occurring in narrow lines of thin-film material when the thin-film resistors are shaped by etching processes.

The present invention overcomes these problems by providing thin-film resistors having a network of intersecting electrically parallel land areas 1200 angstroms thick, 1 mil wide and 500 mils long, formed by a plurality of openings in a thin film of a resistive material such as tantalum nitride. Such resistors may be formed initially with a predetermined geometric configuration which is repeated at regularly spaced intervals along the length of the resistor, or a substantially uniform film of a film-forming metal may be deposited on the surface of a rigid or flexible substrate sheet and spaced portions of the film may be oxidized, sublimed, or removed in any of the many well-known ways to interrupt portions of the resistive film at spaced intervals and form a plurality of electrically parallel paths that are interconnected at predetermined intervals along the parallel paths. Accordingly, regardless of the magnitude of the sheet resistivity of the resistive film, the resistance of the resistors may be increased an appreciable amount by providing a plurality of openings in the film at regularly spaced intervals or in a predetermined pattern.

An object of the present invention is to attain the desired electrical characteristics of thin-film circuits and components by forming a predetermined pattern of apertures in the thin films making up the circuits or components.

Another object of the present invention is to improve the electrical characteristics of thin-film resistors while providing a redundancy of parallel paths of resistive material which results in more reliable resistors.

Another object of the present invention is to provide thin-film resistors having lower inductance and higher power ratings.

Another object of the present invention is to provide more stable and reliable, high value, thin-film resistors wherein the resistive film is interrupted by the absence of the film in spaced areas, and a plurality of interconnected, resistive paths are formed so that the overall area of the thin, resistive film is adjusted to the desired resistivity, in ohms per square, while maintaining the actual thickness of the film constant.

Another object of the present invention is to provide a thin-film resistor formed of anodizable, film-forming material having a plurality of spaced sections which have been oxidized through the entire thickness of the thin film by an anodizing process to increase the resistivity of the thin film.

Figure 5:
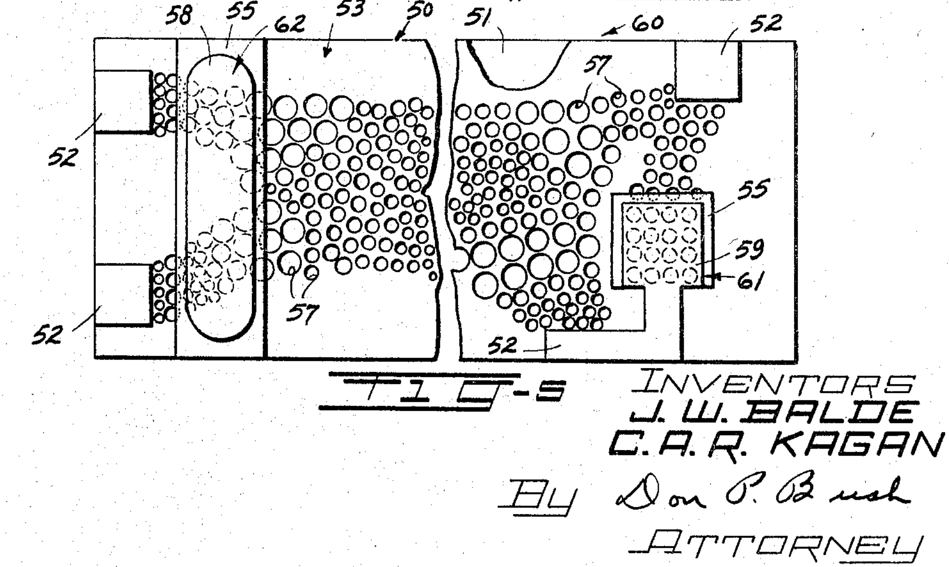

Other objects and features of the present invention will be more readily understood from the following detailed descriptions of specific embodiments thereof when read in conjunction with the accompanying drawings, in which:

FIGS. 1, 2, 3, and 4 are enlarged, fragmentary views of thin-film resistors on which the resistive patterns thereof are formed in different configurations; and FIG. 5 is an enlarged fragmentary view of an integrated thin-film circuit having infinitely variable, distributed parameters.

Referring now to the drawings and particularly to FIG. 1 thereof, there is shown a thin-film resistor, designated generally by the numeral 10, which includes a dielectric substrate sheet 11 made of plastic, glass, mica, ceramic, or other suitable material. The substrate sheet 11 is preferably alkaline-free glass or glazed alumina. An electrical terminal 12 is formed on the substrate sheet 11 at each end of the thin-film resistor 10 in a conventional manner. The electrical terminals 12—12 may be formed of gold which is deposited on the substrate sheet 11 by a silk screen process and fired on the substrate sheet 11. The terminals 12—12 may be formed by depositing a multilayer film of chromium, nickel, and gold on the substrate sheet 11 in the terminal areas. A resistive pattern is formed of an extremely thin layer, designated generally by the numeral 13, of an anodizable, film-forming material such as tantalum nitride extending between the two terminals 12—12.

The resistive pattern is formed on the substrate sheet 11 by a conventional process similar to that disclosed in a copending application of Sidney S. Charschan and Harald Westgaard, Serial No. 314,412, filed October 7, 1963, which is assigned to the assignees of the present application.

The thin film 13, which may be deposited by cathodic sputtering, reactive sputtering, vacuum evaporation, or other suitable process, is made up of a number of fine parallel paths 14—14 of a desired resistive material connected electrically in parallel. The fine parallel paths 14—14 of resistive material are provided with a plurality of electrical cross-connections 16—16 of the same resistive material, so that even though pinhole faults may exist in one of the parallel paths, successive sections of the parallel paths 14—14 are interconnected to the other parallel paths 14—14 to minimize the effect of a pinhole fault in the parallel path and improve the reliability of the resistor 10.

Since the continuity of the resistive film 13 is interrupted by the absence of portions of the film in uniformly spaced areas to form apertures 17—17 in the film 13, and a plurality of interconnected, resistive paths are formed, the overall area of the thin, resistive film 13 is adjusted to the desired resistivity, in ohms per square, while maintaining the actual thickness of the film constant. This enhances the stability and reliability of thin-film resistors 10—10 of a relatively high resistance, in terms of ohms per square.

Each portion of the electrically parallel paths 14—14 adjacent to the apertures 17—17 in the film 13 is a plurality of squares in length. If the apertures 17—17 are in the shape of relatively long rectangles, as illustrated in FIG. 1, it is practical to produce thin-film resistors 10—10 in which the film thickness is approximately 1200 angstroms, and the length of each of the resistive paths 14—14 between the adjacent sides of any two apertures 17—17 in the film 13 is approximately 20 to 60 squares long. If the paths 14—14 were approximately 1 mil wide and 50 mils long, the paths 14—14 are 50 squares. Assuming that there are N number of such paths 14—14 formed in parallel, then the N number of parallel paths would effectively constitute $50/N$ squares of resistive material. If the resistor 10 were ten apertures long, the effective resistive path of the entire resistor would be approximately $500/N$ squares long. If the pattern of the thin film 13 were modified to form a resistor, designated generally by the numeral 20, similar to that illustrated in FIG. 2, wherein alternate rows of rectangular apertures 27—27, formed in a thin, resistive film 23 on a substrate 21, are staggered to form resistive paths 24—24 interconnected by connections 26—26, the effective resistance of the resistive film 23 extending between terminals 22—22 would be the same as that of the resistive film of the resistor 10 illustrated in FIG. 1.

Figure 2:
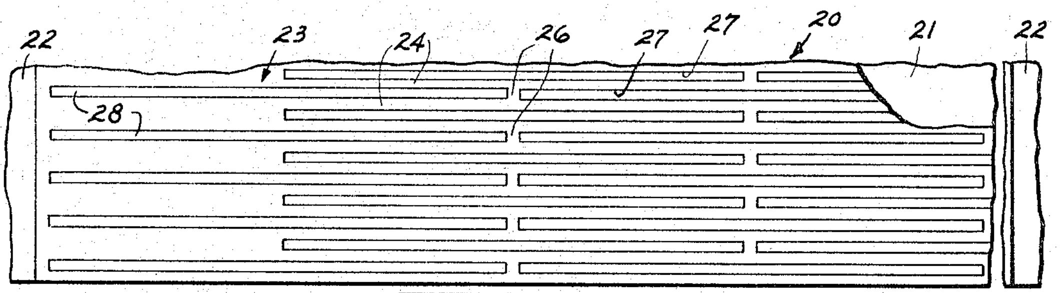

It may appear that resistors 10 and 20 of the patterns illustrated in FIGS. 1 and 2 would have the deficiency explained with respect to pinhole faults in resistors made up of fine zigzag lines; however, an important difference which exists in the type of resistors 10 and 20 illustrated in FIGS. 1 and 2, respectively, which does not occur in resistors formed on the single zigzag path is that the resistive paths 14—14 and 24—24 of the resistors 10 and 20 illustrated in FIGS. 1 and 2, respectively, are in parallel. Therefore, even though one particular resistice path 14 or 24 may be interrupted by a pinhole or etching fault, it is improbable that more than one or two of the parallel paths 14—14 or 24—24 along any one section of the resistor 10 or 20, respectively, will be interrupted by a fault. Current film purities and processing experience in thin-film technology has indicated that the fault density is, in fact, low enough to make multiple fault failures most unlikely. As a result of the redundancy of the parallel paths 14—14 or 24—24, the resultant reliability of the resistor 10 or 20, produced with a pattern of the type illustrated on FIG. 1 or 2, all respectively, is extremely high.

If the apertured, resistive film 13 or 23 is subsequently adjusted by an anodizing process similar to that defined in the above-identified copending Basseches et al. application, the effect of the change in resistance from the normal resistance, which is caused by any faults existing in the parallel paths 14—14 or 24—24, or cross-connections 16—16 or 26—26 of the resistor 10 or 20 when manufactured, can be effectively eliminated. In addition, if any of the parallel paths 14—14 are damaged and become open at some future time during the life of the resistor 10 or 20, the change in the resistance of the particular pattern shown in FIGS. 1 and 2 would be $1/N$ times the effective resistance of the portion of the resistor 10 or 20 which is equal to the length of one of the apertures 17—17 or 27—27 and $1/N \cdot 1/X$ for the entire resistor 10 or 20 where X is the length of the resistor 10 or 20 in terms of the number of the apertures 17—17 or 27—27 along the longitudinal axis of the resistor 10 or 20. If the parallel paths 14—14 or 24—24 are connected together more frequently, the change in effective resistance of the resistor 10 or 20 by a single fault in the resistor 10 or 20 could be reduced without substantially changing the effective resistance of a resistor of the same length.

The unwanted portions of the film 13 or 23 may be removed by any of many well-known ways which include mechanical, electrical, optical, and chemical processes. The apertures 17 or 27 in the thin film 13 or 23 could be made by the same photoetching techniques used for producing the resistors having a single zigzag pattern as disclosed in a related copending application of David A. McLean, Serial No. 330,812, filed December 16, 1963, which is assigned to the Bell Telephone Laboratories, Inc. Alternatively, the apertures can be made by the use of screened resist materials and/or the use of a boiling ten normal solution of a strong base of sodium or potassium hydroxide to remove films such as tantalum or aluminum that are suitable for this etching method. However, the use of strong bases or acids as etchants can be avoided by using anodizing processes of the general type disclosed in the above-identified Basseches et al. application or a copending application of Richard D. Sutch, Serial No. 346,243, filed February 20, 1964, which is assigned to the assignee of the present application.

If the desired pattern of the resistor 10 or 20 were printed on an anodizable thin film 13 or 23, such as tantalum, with a chemical resist by lithographic or silk screening processes, the unwanted portions of the resistive film could be effectively removed to form the apertures 17 or 27 in the resistive film by anodizing the spaced, exposed portions of the film until the entire exposed portions 18 or 28 of the metal film are converted to a dielectric material by changing the exposed portions of the film to an oxide of tantalum, as illustrated in FIGS. 1 and 2.

Anodizing as a means of isolating one thin-film circuit from another is not usually considered suitable because sometime before the film resistance becomes infinite, the current flow concentration causes the film to be opened adjacent to the edge of the nearest conducting path. This causes films of considerable conductance to be left in the center of the anodized area. However, there is little likelihood of this occurring where the anodized areas are relatively small, and the effects of any residual leak paths remaining in the apertures can be compensated for completely if the lattice path of the resistor is anodized subsequently to a predetermined value of resistance.

With the use of the lattice-type resistors of the type illustrated in FIGS. 1 and 2 by using existing methods of resistance control including controlling the composition of the resistive material, controlling the thickness of deposition and utilizing automatic anodizing techniques, it is possible to produce thin-film resistors up to at least 100,000 ohms in values which occupy a surface on a substrate which is only approximately ½-inch long and ⅛-inch wide. This type of thin-film resistor should adequately meet the needs of all electronic circuits since higher resistances can be achieved, when required, by increasing the lengths of the resistors.

Instead of the resistance of the thin, resistive films being increased by effectively removing the unwanted portions of the film by an anodizing process which would require the use of resistive films which are capable of being oxidized by an anodizing process, the resistance of the resistive film may be increased by the removal of a plurality of small, spaced circular sections of the film by halftone etching processes similar to those used for the formation of dots on a halftone printing plate used in halftone reproduction techniques.

Figures 3, 4:
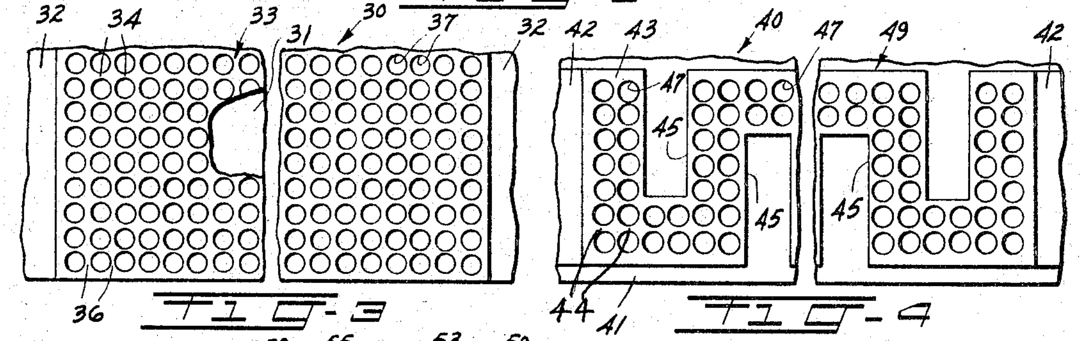

Referring now to FIG. 3, there is shown a resistor, designated generally by the numeral 30, which may be formed by a halftone etching process. The resistor 30 includes a substrate sheet 31 having a plurality of terminals 32—32 supported by the substrate sheet adjacent to the ends thereof. The terminals 32—32 are in ohmic contact with a thin film, designated generally by the numeral 33, of the resistive material extending between the terminals 32—32.

A plurality of apertures 37—37 are formed in the thin film 33 of resistive material by a halftone etching process to form a plurality of electrically parallel paths 34—34 and interconnecting resistive interconnections 36—36. The apertures 37—37 formed by the halftone etching process may be of variable sizes. The size and number of these apertures 37—37 are controlled by the use of photographic techniques. Since the aperture size in halftone printing is a function of the darkness of the original photomaster, photographs of graduated darkness can be made to establish multiport networks having similar characteristics to those formed by lumped resistors (not shown).

A resistor 40 (FIG. 4) of a higher value resistance than that provided by interconnected parallel resistive paths 44—44 formed by apertures 47—47 in a film 43 may be provided. This may be accomplished by removing portions of the thin, resistive film 43 from spaced, rectangular areas 45—45 of a substrate sheet 41 projecting from alternate sides of the resistor 40 to form an effective zigzag screen pattern, designated generally by the numeral 49, extending between a pair of terminals 42—42, as illustrated in FIG. 4.

As illustrated in FIG. 5, a thin-film resistor, designated generally by the numeral 50, may be formed by depositing a thin film, designated generally by the numeral 53, of resistive material on a substrate sheet 51. Apertures 57—57 formed in the thin film 53 of resistive material to control the electrical properties thereof may be varied in size and/or density in predetermined patterns. A plurality of terminals 52—52 may be connected electrically to predetermined areas of the thin film 53 of resistive material to produce a resistive pattern having infinitely distributed parameters which exhibit the same electrical characteristics as networks made up of a plurality of interconnected, lumped resistors (not shown).

Apertured areas of the thin film 53 of resistive material may be anodized to form a dielectric film (not shown) of a predetermined thickness or, alternatively, each area may be covered with a layer 55 of dielectric material such as reactively sputtered tantalum pentoxide. Conductive layers 58 and 59 of specific sizes may be formed over portions of the layers 55—55 of dielectric material to form counter electrodes of capacitors, designated generally by the numerals 61 and 62, respectively.

The capacitors 61 and 62 and the apertured, resistive film 53 cooperate to form an integrated resistive and capacitive network, designated generally by the numeral 60. The counter electrode 59 of the capacitor 61 may be connected physically and electrically to one of the terminals 52 of the integrated network 60. The counter electrode 58 remains isolated physically from the remaining portion of the network 60 except for being supported by the dielectric material 55. Because the counter electrode 58 of the capacitor 62 is electrically insulated from the remainder of the network 60 by the dielectric material, the capacitor 62 effectively forms two capacitors connected in series with each other through the counter electrode 58 and the two effective capacitors are connected effectively in parallel with some of the resistance of the apertured thin, resistive film 53 covered by the counter electrode 58 and in series with the remaining portion of the thin, resistive film 53.

The size, shape, and distribution of the apertures 57—57 in the portion of the resistive film 53, underlying the counter electrodes 58 and 59, are provided to control the effective parallel resistance and permit capacitors of a relatively small value of capacitance to be obtained without having to make the size of the counter electrodes 58 and 59 extremely small. The elimination of interconnecting joints and leads between individual resistors and/or capacitors of a network of resistors and capacitors improves reliability as well as reduces production costs.

The thin films for electrical components and circuits are preferably made of refractory, film-forming metals such as tantalum, niobium, titanium, hafnium, and zirconium or compounds thereof which are capable of being oxidized by an anodizing process. It should be understood that the resistive film does not necessarily need to contain tantalum or some other refractory, film-forming metal, but could be made up of thin films of any of many resistive film-forming materials such as aluminum, carbon, tin, nickel, chromium, antimony, gold, silver, etc. The resistive film may be made of a film-forming element, a mixture of elements, a compound of film-forming materials, or an alloy of film-forming materials. The resistive film may be metallic or nonmetallic or a combination of metals and nonmetals which will give the desired electrical and physical properties. Regardless of the type of resistive, thin film used, the film will be relieved at spaced intervals to increase the normal resistance of the film of resistive material or decrease the capacitance of capacitors formed by the thin-film material.

The term "thin film" has sometimes been used to mean thicknesses less than a few hundred angstroms for which the mean free path of the conduction electrons becomes comparable to the thickness of the film and where conductivity deviates from that of the bulk material. However, at temperatures much lower than room temperature the mean free path of an electron increases, and films of the order of millions of angstroms become comparable to the increased mean free path. It should be understood that the term "thin film" as used herein and in the appended claim will be used to mean films which are sufficiently thin that the electrical properties of the resistive material deviate significantly from its bulk properties by virtue of the effect or interaction of the substrate sheet or base material on which the film is formed and surface boundary conditions on the material. The term "thin film" is further intended to include only those films having sufficiently low tensile strengths that they are not self-supporting and virtually depend on the support of the substrate sheet for their existence.

It is to be understood that the above-described arrangements are simply illustrative of the principles of the invention. Other arrangements may be devised by those skilled in the art which will embody the principles of the invention and fall within the spirit and scope thereof.

What is claimed is:

A thin-film resistor, which comprises:

an electrically nonconductive substrate; and an electrically resistive thin film of tantalum nitride deposited on the substrate in a predetermined lattice-like pattern made up of a plurality of fine lines of the electrically resistive material approximately 1200 angstroms thick, 1 mil wide and 50 mils long forming electrically parallel paths and provided with a plurality of electrically resistive cross-connections approximately 1 mil long and 1 mil wide between the parallel paths at predetermined intervals to minimize the effect of any openings in the parallel paths on the electrical characteristics of the resistor and to improve the reliability of the resistor, the length of the portions of the parallel paths between the electrically resistive cross-connections limiting the variation in resistance of the resistor caused by openings in the parallel paths.

References Cited by the Examiner

UNITED STATES PATENTS

| | | | |
|---|---|---|---|
| 2,360,267 | 10/1944 | Osterheld | 338—268 X |
| 2,457,598 | 12/1948 | Osterheld | 219—536 |
| 2,563,875 | 8/1951 | Salton | 338—308 X |
| 2,682,596 | 6/1954 | Cox et al. | 338—293 |
| 2,792,620 | 5/1957 | Kohring | 29—155.7 |
| 2,827,536 | 3/1958 | Moore et al. | 29—155.7 |
| 2,926,325 | 2/1960 | Moore et al. | 338—308 |
| 2,971,073 | 2/1961 | Eisler | 338—212 X |
| 3,033,970 | 5/1962 | Eisler | 219—549 X |
| 3,099,540 | 7/1963 | Eisler | 219—549 X |
| 3,107,337 | 10/1963 | Kohring | 338—308 |
| 3,214,565 | 10/1965 | Hager et al. | 219—345 |

RICHARD M. WOOD, *Primary Examiner.*

V. Y. MAYEWSKY, *Assistant Examiner.*